United States Patent
Huang et al.

(10) Patent No.: US 10,060,072 B2
(45) Date of Patent: Aug. 28, 2018

(54) DRYER

(71) Applicant: ORIENTAL SYSTEM TECHNOLOGY INC., Hsinchu (TW)

(72) Inventors: Chen-Tang Huang, Zhubei (TW); Chein-Hsun Wang, Hsin-Chu (TW); Chein-Hsing Yu, Hsinchu County (TW); Jenping Ku, Hsinchu County (TW); Ming-Tsung Yang, Hsinchu County (TW)

(73) Assignee: Oriental System Technology Inc., Hsinchu (TW)

( * ) Notice: Subject to any disclaimer, the term of this patent is extended or adjusted under 35 U.S.C. 154(b) by 0 days.

(21) Appl. No.: 15/483,028

(22) Filed: Apr. 10, 2017

(65) Prior Publication Data
US 2018/0119331 A1    May 3, 2018

(30) Foreign Application Priority Data
Oct. 31, 2016    (CN) .......................... 2016 1 0929733

(51) Int. Cl.
*D06F 58/28*    (2006.01)
*D06F 58/02*    (2006.01)
(Continued)

(52) U.S. Cl.
CPC .............. *D06F 58/28* (2013.01); *D06F 58/02* (2013.01); *D06F 58/20* (2013.01); *D06F 58/24* (2013.01);
(Continued)

(58) Field of Classification Search
CPC .......... D06F 58/28; D06F 58/20; D06F 58/24; D06F 2058/2819; D06F 2058/2829;
(Continued)

(56) References Cited

U.S. PATENT DOCUMENTS 3,373,869 A * 3/1968 Burson, Jr. ............. D06F 93/00
                                                                   209/3.1
5,651,192 A * 7/1997 Horwitz .................. D06F 58/28
                                                                   219/494
(Continued)

FOREIGN PATENT DOCUMENTS

DE    102010017232 A1 * 6/2011 ............. D06F 58/28
JP      2004218254 A  *  8/2004
WO   WO 2016037856 A1 * 3/2016 ............. D06F 58/28

OTHER PUBLICATIONS

Fresnel trademark search dated Feb. 21, 2018.*

*Primary Examiner* — Stephen M Gravini
(74) *Attorney, Agent, or Firm* — Muncy, Geissler, Olds & Lowe, P.C.

(57) ABSTRACT

A dryer includes a cylinder, a heater, a motor, a temperature sensor and a controller. The heater heats air and delivers the heated air into the cylinder. The motor is used to drive the cylinder to rotate. The temperature sensor includes a thermopile array sensor and a signal processor. The thermopile array sensor is used to sense an infrared light radiated from clothing and output a sensing signal. The signal processor is used to process the sensing signal to obtain at least one of a temperature distribution uniformity and an average temperature of the clothing, and output a control signal according to the at least one of the temperature distribution uniformity and the average temperature of the clothing. The controller determines to stop the drying schedule according to the control signal. The above-mentioned dryer can stop the drying schedule automatically, so as to save energy.

12 Claims, 6 Drawing Sheets

(51) Int. Cl.
*D06F 58/24* (2006.01)
*G01J 5/12* (2006.01)
*D06F 58/20* (2006.01)

(52) U.S. Cl.
CPC .......... *G01J 5/12* (2013.01); *D06F 2058/288* (2013.01); *D06F 2058/2819* (2013.01); *D06F 2058/2829* (2013.01); *D06F 2058/2841* (2013.01); *D06F 2058/2848* (2013.01); *D06F 2058/2854* (2013.01); *D06F 2058/2861* (2013.01); *D06F 2058/2893* (2013.01); *G01J 2005/123* (2013.01)

(58) Field of Classification Search
CPC ....... D06F 2058/2848; D06F 2058/288; D06F 2058/2893; G01J 2005/123; G01J 5/12
USPC .......................................................... 34/547
See application file for complete search history.

(56) References Cited

U.S. PATENT DOCUMENTS

| | | | | |
|---|---|---|---|---|
| 5,953,831 A | * | 9/1999 | Yu | D06F 58/26 34/269 |
| 6,223,452 B1 | * | 5/2001 | Hamand | D06F 58/04 34/267 |
| 6,784,997 B2 | * | 8/2004 | Lorenz | D06F 39/003 356/429 |
| 8,245,415 B2 | * | 8/2012 | Bellinger | D06F 58/28 34/389 |
| 8,387,274 B2 | * | 3/2013 | Ashrafzadeh | D06F 58/04 34/528 |
| 8,528,228 B2 | * | 9/2013 | Ashrafzadeh | D06F 58/04 116/213 |
| 8,528,230 B2 | * | 9/2013 | Ashrafzadeh | D06F 33/02 116/213 |
| 8,549,770 B2 | * | 10/2013 | Bellinger | D06F 58/28 34/486 |
| 8,549,771 B2 | * | 10/2013 | Hopkins | D06F 58/28 34/528 |
| 8,661,706 B2 | * | 3/2014 | Bellinger | D06F 58/28 34/486 |
| 8,785,856 B2 | * | 7/2014 | Maston | G01J 5/041 250/340 |
| 8,839,527 B2 | * | 9/2014 | Ben-Shmuel | D06F 58/266 34/255 |
| 9,580,860 B2 | * | 2/2017 | Bellinger | D06F 58/28 |
| 2017/0241067 A1 | * | 8/2017 | Bing | D06F 58/26 |
| 2017/0260683 A1 | * | 9/2017 | Simon | D06F 58/28 |

* cited by examiner

DRYER

BACKGROUND OF THE INVENTION

1. Field of the Invention

The present invention relates to a dryer, and more particularly to a dryer having a function for detecting temperature.

2. Description of the Prior Art

Among the general household-consumed electricity, the consumed electricity of a dryer is only less than the consumed electricity of an air conditioning system, and the consumed electricity of the dryer is 2-4 times of that of a washing machine or double of that of an energy-saving refrigerator. Thus, reducing the consumed electricity of the dryer is a positive demand for saving household-consumed electricity. However, as to the traditional dryer, a drying time is mostly determined by the user according to own experience. If the drying time is up and the clothing is still not dried, then the user has to set the drying time again to have the clothing dried. It may be understood that the user will usually set a longer drying time to make sure that the clothing can be dried completely. As a result, the clothing may be dried excessively and energy may be wasted.

A traditional dryer has a resistive humidity sensor disposed within the cylinder. When the clothing is contacted with the resistive humidity sensor, the resistive humidity sensor can sense the humidity of the clothing, such that the controller can determine if the drying schedule has to be ended. However, the dryer adopting the resistive humidity sensor has the following shortcomings: (1) The resistive humidity sensor is apt to be polluted by the cotton, so that the resistive humidity sensor cannot be contact with the clothing completely. Thus, a wrong judgment that the clothing has been dried happens, and a false signal is output. As a result, the user needs to restart the drying schedule, and the extra energy consumption happens. (2) In order to avoid a false signal to be produced, the user often needs to clean the resistive humidity sensor, which causes inconvenience in use. (3) When the amount of the clothing is less, the clothing may not be contact with the resistive humidity sensor or be poor contact with the resistive humidity sensor, so that a false signal is output. (4) When the clothing of different properties (such as cotton/chemical fiber, small/large clothing or thick/thin clothing) is mixed and dried, the resistive humidity sensor cannot distinguish accurately whether all the clothing within the cylinder has been dried completely.

If it cannot be determined correctly that all the clothing has been dried completely, the user may abandon the automatic drying schedule and operate manually, which may consume more electricity. The above-mentioned shortcomings may not be overcome even by disposing a plurality of resistive humidity sensors. For this reason, the most important goal for now is to determine correctly that the clothing has been dried completely.

SUMMARY OF THE INVENTION

The present invention is directed to provide a dryer, which utilizes a thermopile array sensor to sense at least one of a temperature distribution uniformity and an average temperature of the clothing, and determines accordingly whether all the clothing has been dried completely, so as to control the dryer to automatically stop the drying schedule and achieve the goal of saving energy.

A dryer of one embodiment of the present invention includes a cylinder, a heater, a motor, a temperature sensor and a controller. The cylinder is used to receive clothing and has an opening and an air outlet. The heater is used to heat air and deliver the heated air into the cylinder. The motor is connected to the cylinder to drive the cylinder to rotate. The temperature sensor includes a thermopile array sensor and a signal processor. The thermopile array sensor is used to sense an infrared light radiated from the clothing and output a sensing signal. The signal processor is electrically connected to the thermopile array sensor to process the sensing signal to obtain at least one of a temperature distribution uniformity and an average temperature of the clothing, and output a control signal according to the at least one of the temperature distribution uniformity and the average temperature of the clothing. The controller is electrically connected to the heater, the motor and the temperature sensor and determines to stop the heater and the motor according to the control signal.

The objective, technologies, features and advantages of the present invention will become apparent from the following description in conjunction with the accompanying drawings wherein certain embodiments of the present invention are set forth by way of illustration and example.

DESCRIPTION OF THE PREFERRED EMBODIMENT

Various embodiments of the present invention will be described in detail below and illustrated in conjunction with the accompanying drawings. In addition to these detailed descriptions, the present invention can be widely implemented in other embodiments, and apparent alternations, modifications and equivalent changes of any mentioned embodiments are all included within the scope of the present invention and based on the scope of the Claims. In the descriptions of the specification, in order to make readers have a more complete understanding about the present invention, many specific details are provided; however, the present invention may be implemented without parts of or all the specific details. In addition, the well-known steps or elements are not described in detail, in order to avoid unnecessary limitations to the present invention. Same or similar elements in Figures will be indicated by same or similar reference numbers. It is noted that the Figures are schematic and may not represent the actual size or number of the elements. For clearness of the Figures, some details may not be fully depicted.

Figure 1:
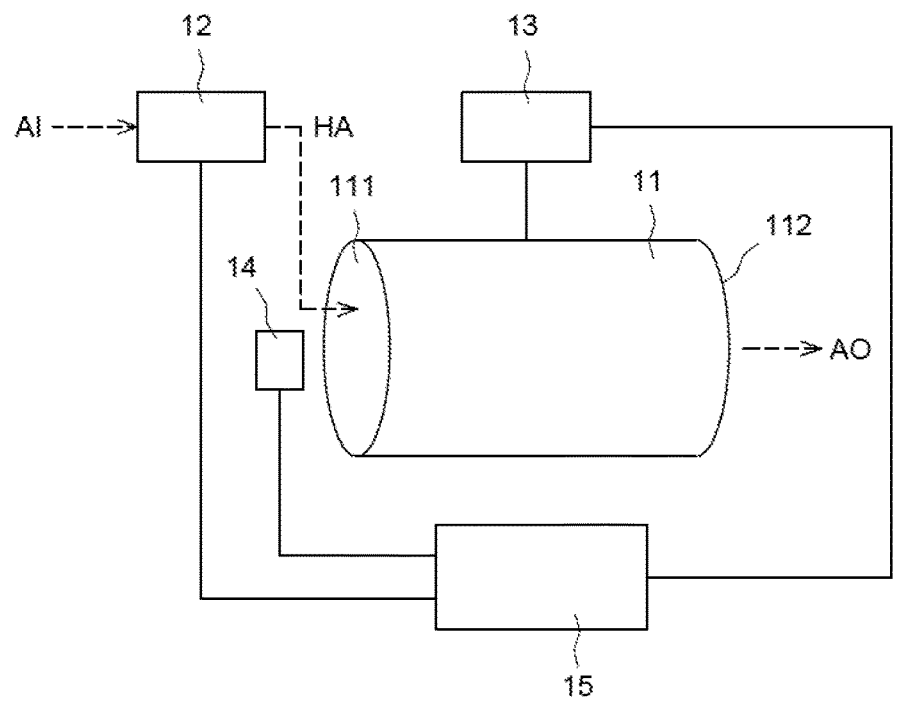
FIG. 1 is a diagram schematically illustrating a dryer of the first embodiment of the present invention.

Referring to FIG. 1, a dryer of one embodiment of the present invention includes a cylinder 11, a heater 12, a motor 13, a temperature sensor 14 and a controller 15. The cylinder 11 has an opening 111 and an air outlet 112. The clothing that needs to be dried may be put into the cylinder 11 through the opening 111. The heater 12 may heat the input air AI, and the heated air HA may be delivered into the cylinder 11 to heat the clothing, such that the water in the clothing may be evaporated and the clothing may be dried. The air AO in the cylinder 11 that contains much moisture may be discharged through the air outlet 112 of the cylinder 11. It can be understood that those skilled in the art may know that disposing a drawing device may improve the efficiency of the air flow, which is not the main subject matter of the present invention and therefore, is not described here. The motor 13 is connected to the cylinder 11 to drive the cylinder 11 to rotate. When the cylinder 11 rotates, the cylinder 11 can tumble the clothing within the cylinder 11, such that all the clothing within the cylinder 11 may be heated evenly. It is needed to be explained that, in the embodiment depicted in FIG. 1, the heated air HA is delivered into the cylinder 11 through the opening 111, which is only a schematic description and can not be used to limit the present invention.

Figure 2:
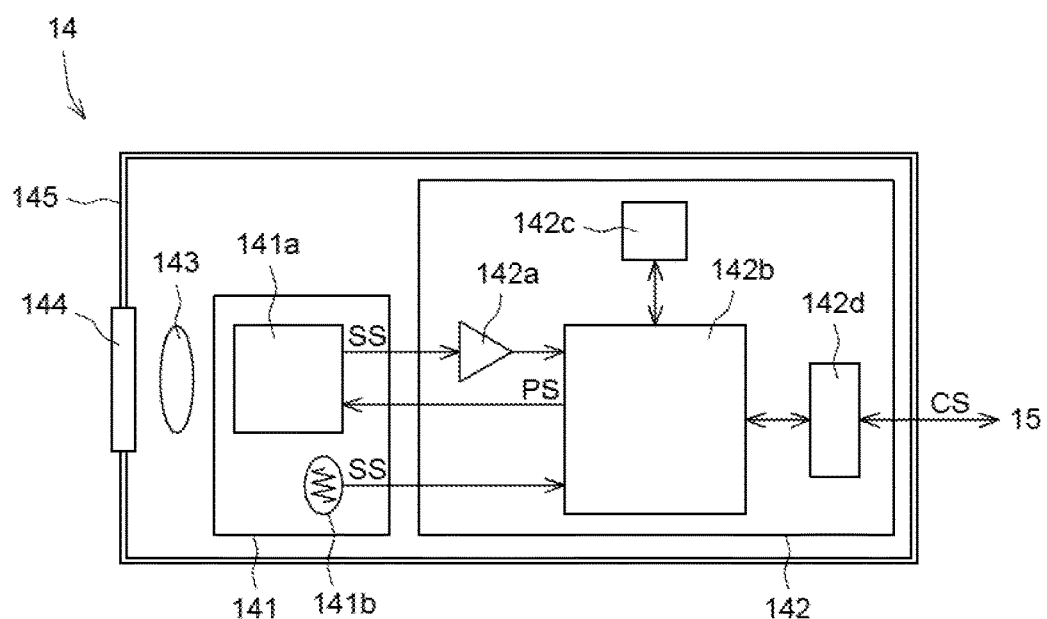
FIG. 2 is a diagram schematically illustrating a temperature sensor of a dryer of one embodiment of the present invention.

Referring to FIG. 2 in conjunction, the temperature sensor 14 includes a thermopile array sensor 141 and a signal processor 142. The thermopile array sensor 141 may sense an infrared light radiated from the clothing within the cylinder 11 and output a sensing signal SS. The signal processor 142 is electrically connected to the thermopile array sensor 141. The signal processor 142 may process the sensing signal SS output by the thermopile array sensor 141 to obtain at least one of a temperature distribution uniformity and an average temperature of the clothing within the cylinder 11. The signal processor 142 may determine that whether the clothing within the cylinder 11 has been dried completely according to at least one of the temperature distribution uniformity and the average temperature of the clothing, and output a control signal CS accordingly. The controller 15 is electrically connected to the heater 12, the motor 13 and the temperature sensor 14. The controller 15 may determine to stop the heater 12 and the motor 13, i.e., stop the drying schedule, or adjust the drying parameters, such as the wind speed or the drying temperature, etc. according to the control signal CS output by the temperature sensor 14.

In one embodiment, the thermopile array sensor 141 includes a thermopile array sensing element 141a and a thermistor 141b. The thermopile array sensing element 141a and the thermistor 141b output a sensing signal SS to the signal processor 142 respectively. The thermopile array sensing element 141a may be a two-dimensional array sensor, such as 8×8, 16×16 or 32×32 pixels, etc. The thermistor 141b may compensate for the thermopile array sensing element 141a to obtain a more accurate sensing result.

The signal processor 142 outputs a pixel selection signal PS to the thermopile array sensing element 141a, the thermopile array sensing element 141a outputs the sensing signal SS of the selected sensing pixel to a preamplifier 142a, and the sensing signal SS after amplified is input to a microcontroller 142b. A digital-analog converter built in the microcontroller 142b converts the sensing signal SS output by the thermopile array sensing element 141a into a digital signal. Likewise, the resistance of the thermistor 141b is also converted through the digital-analog converter built in the microcontroller 142b, so as to obtain the environment temperature. A non-volatile memory 142c may be used to store the parameter values of the thermopile array sensing element 141a and the thermistor 141b, which may be used to calculate the value of the measured temperature. A communication interface 142d may be used to output the control signal CS to the controller 15. For example, the communication interface 142d may be the $I_2C$, USB, UART, analog voltage output or logic IO output. It can be understood that the non-volatile memory 142c and the communication interface 142d may be integrated into the microcontroller 142b, such as the microcontroller STM8L151G6U6.

In one embodiment, the temperature sensor 14 further includes a lens 143 disposed at a receiving end of the thermopile array sensor 141. The lens 143 is used for the imaging of the thermopile array sensing element 141a. The focal length of the lens 143 and the size of the thermopile array sensing element 141a may determine a sensing angle of the thermopile array sensor 141 that is used to receive the infrared light. For example, the sensing angle of the thermopile array sensor 141 is less than or equal to 90 degrees. Preferably, the sensing angle of the thermopile array sensor 141 is between 45 and 90 degrees. It can be understood that a material of the lens 143 must be transmissible for the infrared light. For example, the material of the lens 143 may be silicon or germanium, which is transmissible for the infrared light having a wavelength of 1-12 µm. In one embodiment, the lens 143 is a siliceous Fresnel lens.

In one embodiment, the temperature sensor 14 further includes a protective cover 144 disposed at the receiving end of the thermopile array sensor 141. For example, the thermopile array sensor 141 and the signal processor 142 are disposed within a housing 145, and the thermopile array sensor 141 receives the infrared light through a window of the housing 145. The protective cover 144 is disposed on the window of the housing 145 to protect the related elements of the temperature sensor 14. In one embodiment, a material of the protective cover 144 may be High Density Polyethylene (HDPE).

It can be understood that the temperature sensor 14 receives the infrared light radiated from the clothing within the cylinder 11 to measure the temperature information. Thus, the temperature sensor 14 does not need to be contact with the clothing within the cylinder 11. In other words, the disposing position of the temperature sensor 14 is more elastic, and a false signal due to poor contact with the clothing (such as cotton accumulation or less clothing) can be avoided. For example, the temperature sensor 14 may be disposed at a side (inside the cylinder 11) of the window at the air outlet 111 of the cylinder 11. In addition, the infrared light can transmit through cotton and not be shaded by cotton. Therefore, even if cotton is accumulated on the window, it can never affect the reception of the infrared light by the temperature sensor 14.

Figure 3:
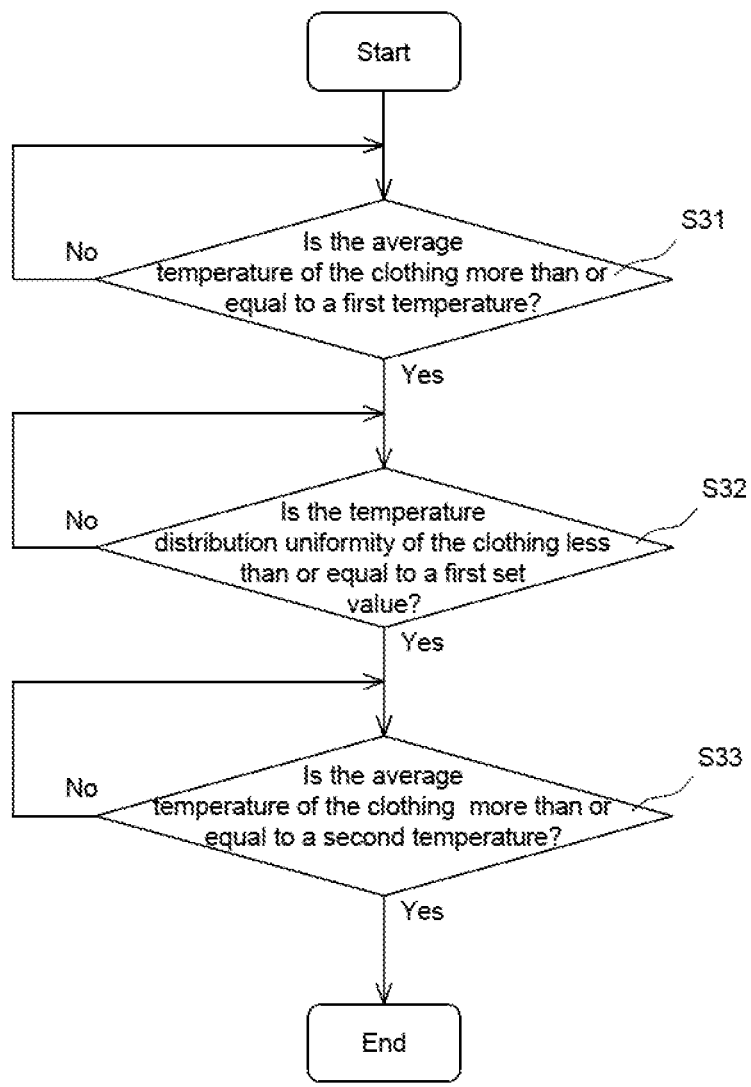
FIG. 3 is a flow chart, schematically illustrating the steps of a dryer of one embodiment of the present invention for determining whether the clothing has been dried completely.

Referring to FIG. 3, a method for the dryer of the present invention to determine that whether the clothing has been dried completely is described. After the drying schedule starts, determine that whether the average temperature of the clothing within the cylinder 11 is more than or equal to a first temperature (S31), such as 40 degrees Celsius. If the average temperature has not reached 40 degrees Celsius, then repeat the step S31. When the average temperature has reached 40 degrees Celsius, it means that the clothing within the cylinder 11 has been preliminarily dried. Because a thickness of a sewing place of the clothing is thicker, especially for the jeans, the sewing place may not be dried easily. At this point, it is needed to determine that whether the temperature distribution uniformity of the clothing is less than or equal to a first set value (S32). For example, in the temperature distribution image, a temperature difference between a place having the highest temperature and a place having the lowest temperature should be less than a preset value, which means that the place having the lowest temperature is also starts to gradually heat up and approach the temperature of the place having the highest temperature or the drying temperature. If the temperature distribution uniformity is more than the first set value, then repeat the step S32. If the temperature distribution uniformity has reached the first set value, then determine that whether the average temperature of the clothing within the cylinder 11 is more than or equal to a second temperature (S33), such as 50 or 55 degrees Celsius. If not, then repeat the step S33. If the average temperature of the clothing within the cylinder 11 has reached the second temperature, it means that the clothing has been dried completely, and at this point, the drying schedule may be ended, i.e., stop heating and rotating the cylinder 11. It should be noted that the above-mentioned method to determine that whether the clothing has been dried completely is only an example. Those skilled in the art may modify the above-mentioned steps to achieve the purpose of determining that whether the clothing has been dried completely. For example, determining that whether the clothing has been dried completely may be only based on the average temperature or the temperature distribution uniformity of the clothing.

Figure 4:
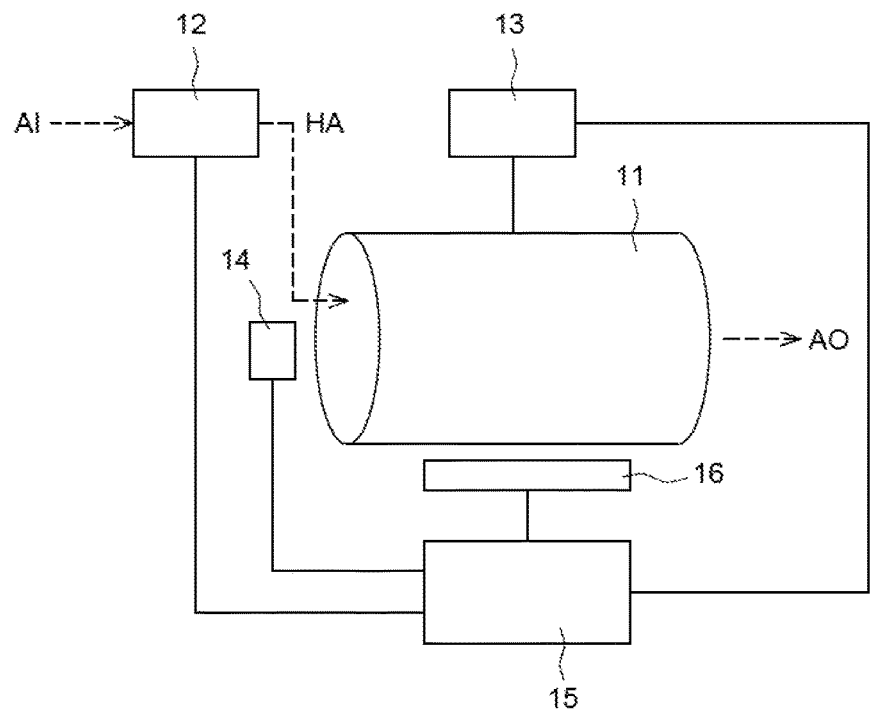
FIG. 4 is a diagram schematically illustrating a dryer of the second embodiment of the present invention.

Referring to FIG. 4, in one embodiment, the dryer of the present invention further includes a weight sensor 16 electrically connected to the controller 15. In the embodiment shown in FIG. 4, the weight sensor 16 is directly connected to the controller 15, but is not limited to this. The weight sensor 16 may be electrically connected to the temperature sensor 14 as well, and the sensing signal output by the weight sensor 16 may be output to the controller 15 via the temperature sensor 14. The weight sensor 16 may measure a weight of the clothing within the cylinder 11, and the controller may estimate a water content of the clothing according to the weight of the clothing. For example, the dryer of the present invention may integrate the washing function, i.e., include the water-washing, dehydrating and drying functions. At this point, before washing, the weight sensor 16 may measure a dry weight of the clothing. After the washing and dehydrating schedule, the weight sensor 16 may measure a wet weight of the clothing. The difference between the wet weight and the dry weight of the clothing is the more accurate water content of the clothing. Then, a more accurate drying time may be estimated according to the water content of the clothing and the drying ability of the dryer. It is needed to be explained that the water content of the clothing may be estimated only according to the wet weight of the clothing. For example, the bibulous rate of the clothing of different materials, i.e., the percentage of the water content of the cotton and chemical fiber clothing of unit weight after dehydration, may be obtained according to the experimental results. Based on the material proportion of the to-be-dried clothing set by the user before drying, such as 80% cotton and 20% chemical fiber or 50% for each, and based on the wet weight information of the clothing measured by the weight sensor 16, the water content of the to-be-dried clothing may be estimated roughly, so that the drying time for drying the clothing may also be estimated and used as a reference for the user.

Figure 5:
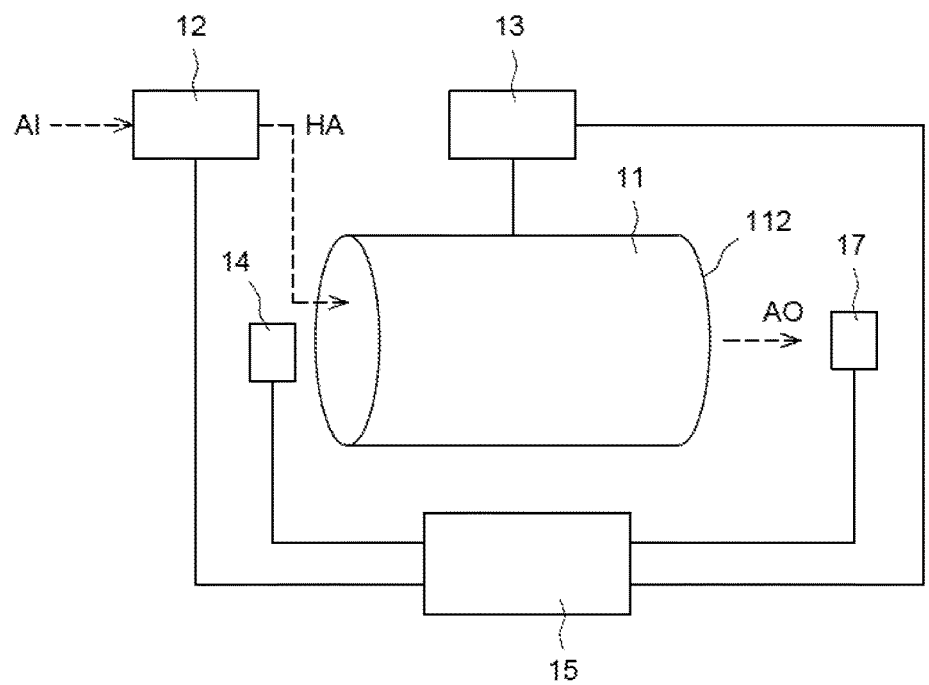
FIG. 5 is a diagram schematically illustrating a dryer of the third embodiment of the present invention.
Figure 6:
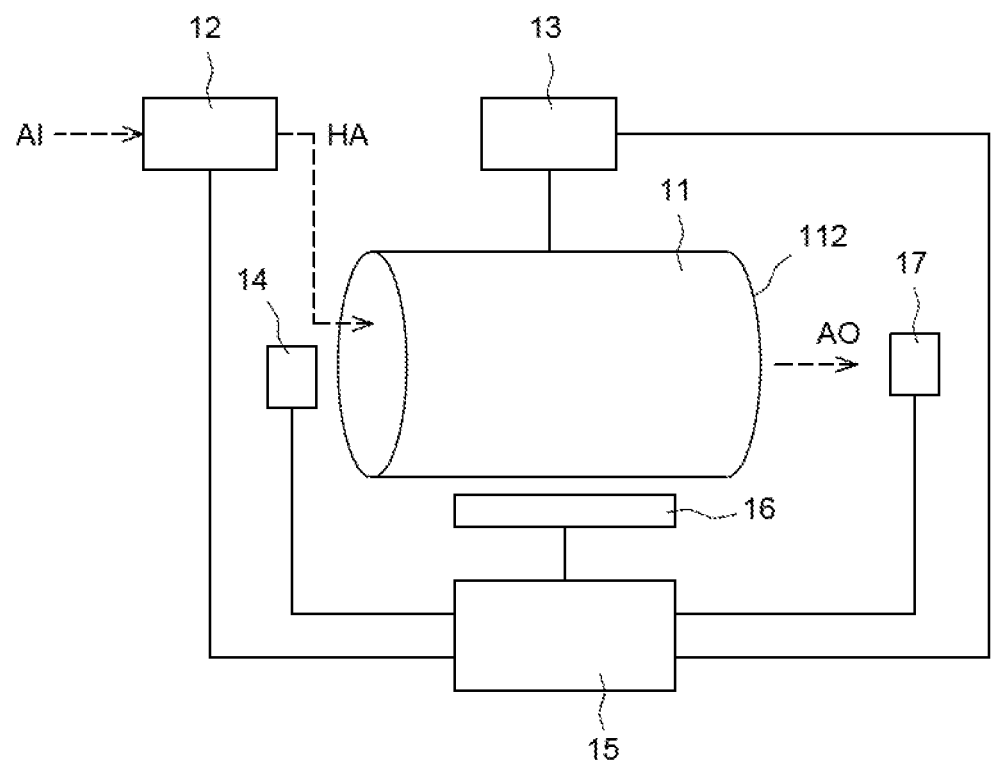
FIG. 6 is a diagram schematically illustrating a dryer of the fourth embodiment of the present invention.

Referring to FIG. 5, in one embodiment, the dryer of the present invention further includes a digital temperature and humidity sensor 17 disposed at the air outlet 112 of the cylinder 11 and electrically connected to the controller 15. The digital temperature and humidity sensor 17 may measure a temperature and a humidity of the discharged air AO. The controller 15 may calculate the water content in unit volume according to the temperature and the humidity of the discharged air AO measured by the digital temperature and humidity sensor 17. Assume that the wind speed is constant, and the controller 15 may calculate the volume of the discharged air AO discharged in unit time and the water content thereof, i.e., a drying rate. Calculating the drying rate in real time may help to estimate a more accurate drying time. It can be understood that, referring to FIG. 6, in a preferred embodiment, the dryer of the present invention may include both the weight sensor 16 and the digital temperature and humidity sensor 17. The controller 15 may obtain the water content of the clothing and the real-time drying rate and calculate a very accurate drying time needed, so that the user may arrange her time efficiently according to the remaining drying time needed.

Figure 7:
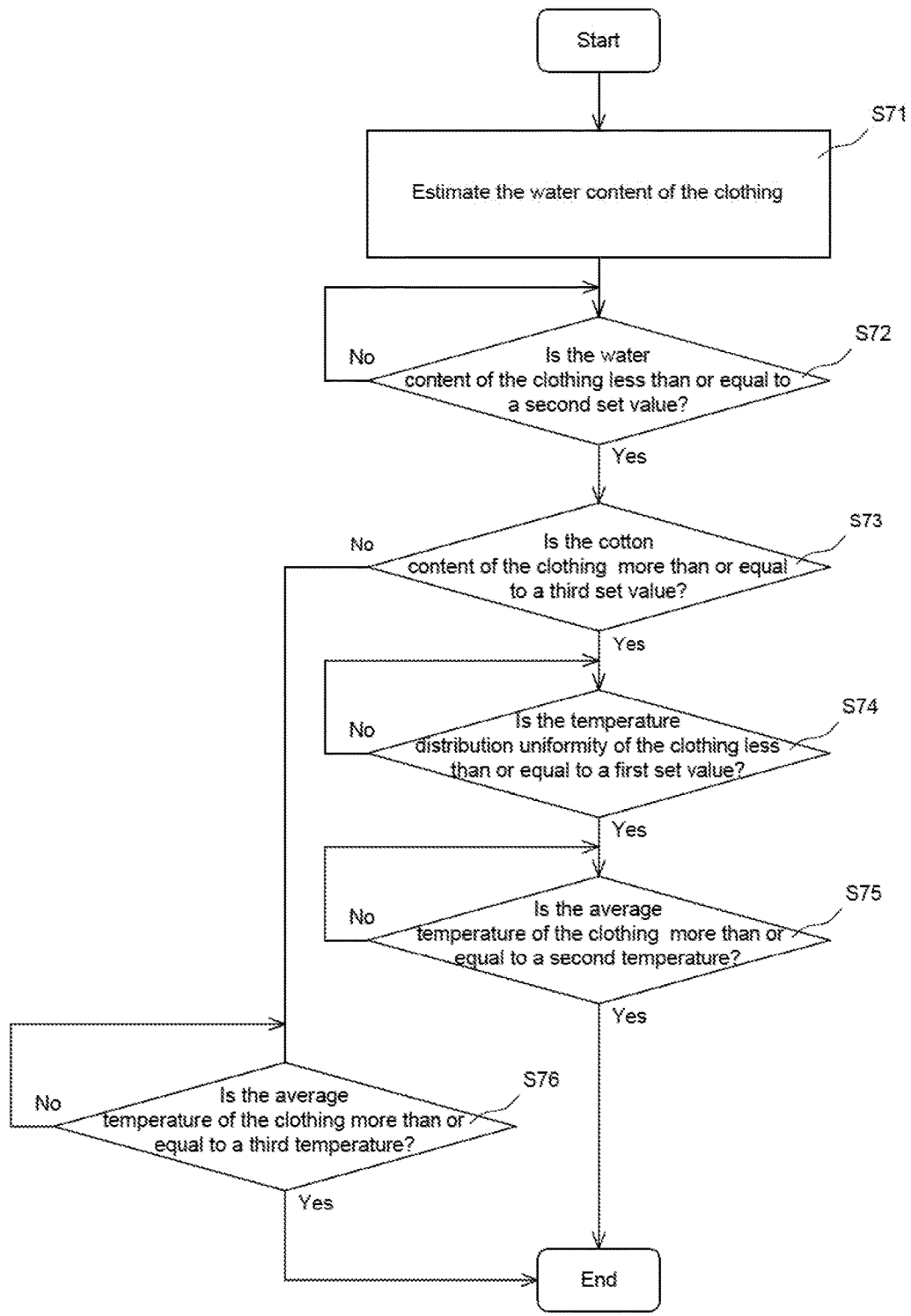
FIG. 7 is a flow chart, schematically illustrating the steps of a dryer of another embodiment of the present invention for determining whether the clothing has been dried completely.

Referring to FIG. 7, another method for the dryer of the present invention to determine that whether the clothing has been dried completely is described. First, estimate the water content of the clothing according to the weight information measured by the weight sensor 16 (S71). Preferably, measure the dry weight and the wet weight of the clothing, so that a more accurate water content of the clothing may be obtained. Additionally, the increasing amount of the water content of the clothing may be used to determine the material of the clothing. For example, more cotton clothing contained may increase more water content. On the other hand, more chemical fiber clothing contained may increase less water content. Then, determine that whether the water content of the clothing is less than or equal to a second set value (S72). If not, then repeat the step S72. If the water content of the clothing is less than or equal to the second set value, determine that whether the cotton content of the clothing is more than or equal to a third set value (S73). If the cotton content of the clothing is more than or equal to the third set value, it means that more cotton clothing is contained, and thus, perform the step S74 to determine that whether the temperature distribution uniformity of the clothing is less than or equal to a first set value. If the temperature distribution uniformity of the clothing is not less than or equal to the first set value, then repeat the step S74. If the temperature distribution uniformity of the clothing is less than or equal to the first set value, then determine that whether the average temperature of the clothing is more than or equal to a second temperature (S75). If the average temperature of the clothing is not more than or equal to a second temperature, then repeat the step S75. If the average temperature of the clothing is more than or equal to the second temperature, it means that the clothing has been dried completely and the drying schedule may be ended.

Returning to the step S73, if the cotton content of the clothing is less than the third set value, it means that more chemical fiber clothing is contained, and then perform the step S76. Because the chemical fiber clothing may be dried more easily, determining that whether the average temperature of the clothing is more than or equal to a third temperature may directly determine that whether the clothing has been dried completely. If the average temperature of the clothing is more than or equal to the third temperature, then the drying schedule may be ended. It should be noted that the determining steps shown in FIG. 7 may be added, deleted or modified, and the purpose of determining whether the clothing has been dried completely may be achieved without departing from the scope of the present invention.

Figure 8:
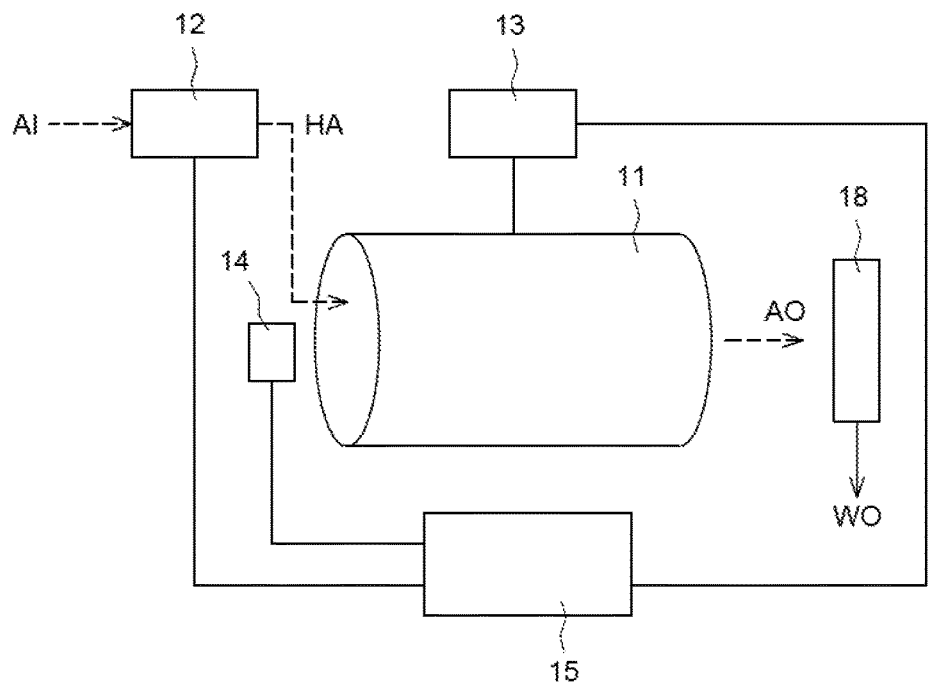
FIG. 8 is a diagram schematically illustrating a dryer of the fifth embodiment of the present invention.

Referring to FIG. 8, in one embodiment, the dryer of the present invention further includes a condenser 18 disposed at the air outlet 112 of the cylinder 11. The condenser 18 may condense the moisture WO in the discharged air AO and discharge it through a preset line altogether. As a result, the discharged air AO that contains a lot of moisture may be avoided to be directly discharged into the house, which may cause the house damp.

Figure 9:
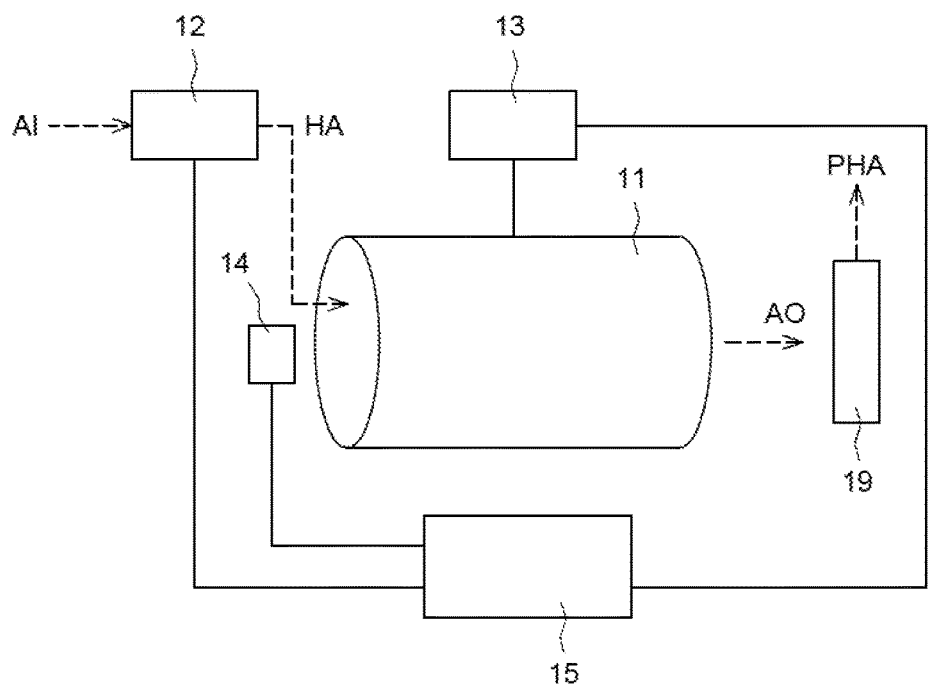
FIG. 9 is a diagram schematically illustrating a dryer of the sixth embodiment of the present invention.

Referring to FIG. 9, in one embodiment, the dryer of the present invention further includes a heat exchanger 19 disposed at the air outlet 112 of the cylinder 11. The heat exchanger 19 may recycle the thermal energy of the discharged air AO for some appropriate applications. For example, the recycled thermal energy may be used to preheat air, and the preheated air PHA may be heated to a preset temperature with the heater 12 and delivered into the cylinder 11, so that the energy consumption of the heater 12 may be reduced. Or, the recycled thermal energy may also be applied to the warming air function of the air conditioning system.

To sum up the foregoing descriptions, the dryer of the present invention utilizes a thermopile array sensor to sense at least one of a temperature distribution uniformity and an average temperature of the clothing without contact with the clothing, and determines accordingly that whether all the clothing has been dried completely. Therefore, the dryer of the present invention may avoid a false signal due to the poor contact between the clothing and the sensor (such as cotton accumulation or less clothing). Moreover, even if cotton is accumulated on the sensing window, it can never affect the reception of the infrared light by the temperature sensor, and a precise measurement result can be obtained. Therefore, the dryer of the present invention may accurately determine that whether the clothing has been dried completely, so as to automatically stop the drying schedule and achieve the effect of saving energy.

What is claimed is:

1. A dryer comprising:
   a cylinder receiving clothing and having an opening and an air outlet;
   a heater heating air and delivering the heated air into the cylinder;
   a motor connected to the cylinder to drive the cylinder to rotate;
   a temperature sensor comprising:
      a thermopile array sensor sensing an infrared light radiated from the clothing and outputting a sensing signal;
      a lens disposed at a receiving end of the thermopile array sensor used to limit a sensing angle of the thermopile array sensor; and
      a signal processor electrically connected to the thermopile array sensor to process the sensing signal to obtain at least one of a temperature distribution uniformity and an average temperature of the clothing, and output a control signal according to the at least one of the temperature distribution uniformity and the average temperature of the clothing; and
   a controller electrically connected to the heater, the motor and the temperature sensor to determine to stop or adjust the heater and the motor according to the control signal.

2. The dryer according to claim 1, wherein the sensing angle is less than or equal to 90 degrees.

3. The dryer according to claim 1, wherein a material of the lens is silicon or germanium.

4. The dryer according to claim 1, wherein the lens is a siliceous Fresnel lens.

5. The dryer according to claim 1, wherein the temperature sensor comprises a protective cover, the lens is disposed between the receiving end of the thermopile array sensor and the protective cover.

6. The dryer according to claim 5, wherein a material of the protective cover is High Density Polyethylene (HDPE).

7. The dryer according to claim 1, wherein the thermopile array sensor comprises a thermopile array sensing element and a thermistor.

8. The dryer according to claim 1, further comprising:
   a weight sensor electrically connected to the controller, wherein the weight sensor is configured to measure a weight of the clothing, and the controller is configured to estimate a water content of the clothing according to the weight of the clothing.

9. The dryer according to claim 8, further comprising:
   a digital temperature and humidity sensor disposed at the air outlet of the cylinder and electrically connected to the controller, wherein the digital temperature and humidity sensor is configured to measure a temperature and a humidity of a discharged air through the air outlet and the controller is configured to estimate a drying time according to the temperature and the humidity and the water content of the clothing.

10. The dryer according to claim 1, further comprising:
    a digital temperature and humidity sensor disposed at the air outlet of the cylinder and electrically connected to the controller, wherein the digital temperature and humidity sensor is configured to measure a temperature and a humidity of a discharged air through the air outlet and the controller is configured to estimate a drying rate according to the temperature and the humidity.

11. The dryer according to claim 1, further comprising:
    a condenser disposed at the air outlet of the cylinder to condense a moisture of a discharged air through the air outlet.

12. The dryer according to claim 1, further comprising:
    a heat exchanger disposed at the air outlet of the cylinder to recycle a thermal energy of a discharged air through the air outlet.

* * * * *